(12) United States Patent
Wenneman et al.

(10) Patent No.: US 11,710,355 B1
(45) Date of Patent: Jul. 25, 2023

(54) VEHICLE FLEET INFORMATION SERVICE

(71) Applicant: Amazon Technologies, Inc., Seattle, WA (US)

(72) Inventors: Michael Christopher Wenneman, Seattle, WA (US); Christophe Charpentier, Seattle, WA (US); Marco Argenti, Mercer Island, WA (US); Kunal Bhasin, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 868 days.

(21) Appl. No.: 16/581,571

(22) Filed: Sep. 24, 2019

(51) Int. Cl.
*G07C 5/08* (2006.01)
*G06F 8/65* (2018.01)
*G07C 5/00* (2006.01)
*G06F 13/42* (2006.01)
*G07C 5/06* (2006.01)
*H04L 67/12* (2022.01)
*H04L 12/40* (2006.01)
*H04L 9/40* (2006.01)
*H04W 12/03* (2021.01)

(52) U.S. Cl.
CPC ............ *G07C 5/008* (2013.01); *G06F 13/4282* (2013.01); *G07C 5/06* (2013.01); *H04L 12/40013* (2013.01); *H04L 63/0428* (2013.01); *H04L 67/12* (2013.01); *H04L 67/141* (2013.01); *H04W 12/03* (2021.01); *G06F 2213/40* (2013.01)

(58) Field of Classification Search
None
See application file for complete search history.

(56) References Cited

U.S. PATENT DOCUMENTS

| | | | |
|---|---|---|---|
| 9,280,653 B2 | 3/2016 | Forest | |
| 9,396,092 B1 | 7/2016 | Kuo et al. | |
| 9,854,442 B2 | 12/2017 | Mazzara, Jr. | |
| 10,395,444 B1* | 8/2019 | Edren et al. | G07C 5/0808 |
| 11,063,916 B1 | 7/2021 | Ferreira | |
| 2005/0060070 A1* | 3/2005 | Kapolka et al. | G07C 5/008 701/31.4 |
| 2015/0264017 A1* | 9/2015 | Saed et al. | H04L 63/045 380/270 |
| 2016/0099806 A1 | 4/2016 | Racklyeft et al. | |

(Continued)

OTHER PUBLICATIONS

Lili Zhang et al., "A DRM System Based on PKI", 2010 Fourth International Conference on Genetic and Evolutionary Computing, IEEE, 2010, Pages 522-525.

(Continued)

*Primary Examiner* — Steve R Young
(74) *Attorney, Agent, or Firm* — Alexander A. Knapp; Kowert, Hood, Munyon, Rankin & Goetzel, P.C.

(57) ABSTRACT

A vehicle information service implemented on one or more computers of a service provider network implements a first application programmatic interface (API) that allows a client to define inclusion parameters and a sample size for a fleet of vehicles from which vehicle data is to be collected. The vehicle information service also implements a second API that notifies the client when the requested vehicle data has been collected from the vehicle fleet. Additionally, the vehicle information service provides the client access to the collected vehicle data. The vehicle information service manages the collection of the vehicle data from the client defined vehicle fleet without requiring further client involvement and notifies the client when the collection of the vehicle data is complete.

20 Claims, 11 Drawing Sheets

(56) References Cited

U.S. PATENT DOCUMENTS

| | | | |
|---|---|---|---|
| 2016/0330032 A1 | 11/2016 | Naim et al. | |
| 2017/0134382 A1* | 5/2017 | Darnell et al. | H04L 9/3297 |
| 2018/0336144 A1* | 11/2018 | Olarig et al. | H04N 5/772 |
| 2019/0025813 A1* | 1/2019 | Cella et al. | H04L 1/0002 |
| 2019/0268083 A1* | 8/2019 | Cho et al. | H04W 4/23 |
| 2020/0066062 A1* | 2/2020 | Weber | G07C 5/008 |
| 2020/0120100 A1* | 4/2020 | Hu et al. | H04L 67/60 |
| 2020/0201621 A1* | 6/2020 | Buecherl et al. | G06F 8/65 |
| 2020/0364953 A1* | 11/2020 | Simoudis | G06N 5/022 |

OTHER PUBLICATIONS

Mattias Ohrn, "Publice Key Infrastructure Utilisation in Digital Rights Management", KTH Numerical Analysis and Computer Science, 2004, Pages 1-84.

U.S. Appl. No. 16/453,921, filed Jun. 26, 2019, Marco Argenti.

\* cited by examiner

US 11,710,355 B1

1
VEHICLE FLEET INFORMATION SERVICE

BACKGROUND

For various reasons, a vehicle manufacturer, a parts manufacturer, or other entity may desire to collect vehicle status information for a fleet of vehicles. For example, a vehicle manufacturer may desire to collect vehicle status information, such as gas mileage, engine performance, driving conditions, etc., from vehicles manufactured by the vehicle manufacturer in order to improve vehicle design or performance. Also, as another example, a parts manufacturer may desire to collect vehicle status information from vehicles including parts manufactured by the parts manufacturer to improve part design or performance.

Some vehicles may allow limited remote access to vehicle status information, such as from a controller area network of a vehicle or via an on-board diagnostic interface of a vehicle. For example, a remote vehicle start application may, subsequent to sending a command to remotely start a vehicle, receive a status confirmation from a controller area network of the vehicle that the vehicle has started. Also, as another example, a mechanic at an authorized service center may be able to connect a diagnostic tool to an on-board diagnostic interface of a vehicle to view vehicle status information.

However, such systems and methods of collecting vehicle information, such as connecting a diagnostic tool to a vehicle at an authorized service center or receiving a confirmation message from a controller area network in response to a command, are designed for communications with individual vehicles, one-by-one, and may be time-consuming and labor-intensive for collecting vehicle status information from a large number of vehicles, such as in a vehicle fleet. Also, identifying vehicles to include in a vehicle fleet may be time-consuming and labor-intensive.

Figure 1:
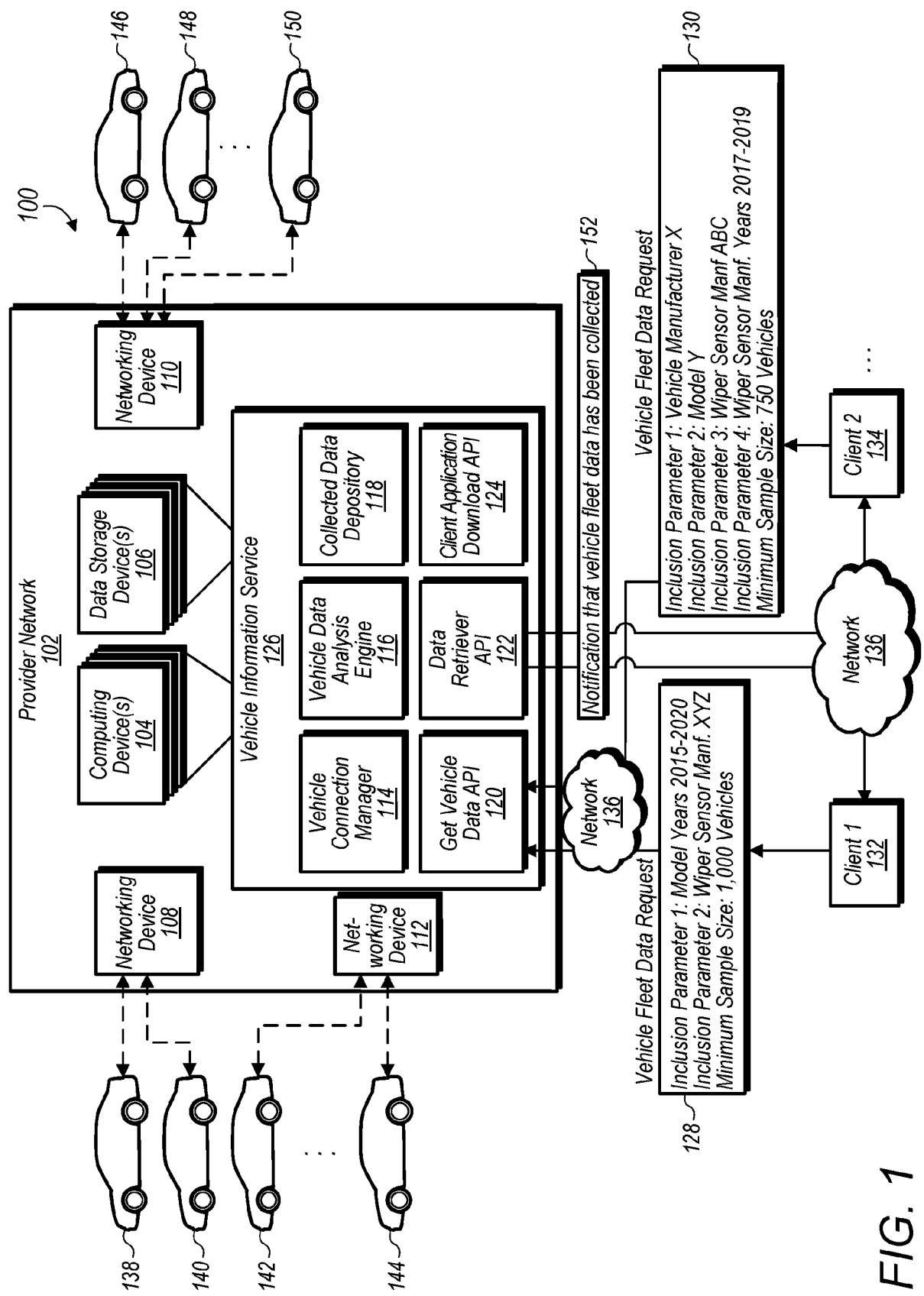
FIG. 1 illustrates a provider network that implements a vehicle information service, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle information service, according to some embodiments. In some embodiments, a system for implementing a vehicle information service includes a service provider network comprising one or more networking devices and one or more computers. The one or more networking devices are configured to establish connections between the service provider network and a plurality of vehicles. Also, the one or more computers are configured to implement a first application programmatic interface (API), such as a "get vehicle data" API, and a second API, such as a "data retriever" API. The first API (e.g. the get vehicle data API) is configured to receive, from a client of the vehicle information service, a set of one or more inclusion parameters for vehicles to be included in a vehicle fleet from which data is to be collected. The first API (e.g. the get vehicle data API) is also configured to receive, from the client, a minimum sample size for the vehicle fleet, wherein the minimum sample size defines a minimum number of vehicles to collect data from that satisfy the one or more inclusion parameters. Additionally, the second API (e.g. the data retriever API) is configured to send a notification to the client in response to data being collected from the minimum number of vehicles of the vehicle fleet and provide, to the client, access to a data set comprising data collected from the minimum number of vehicles of the vehicle fleet.

To collect the data from the minimum number of vehicles of the vehicle fleet, the one or more computers are configured to cause the one or more networking devices to establish respective connections between the provider network and respective ones of a set of the plurality of vehicles. The one or more computers are also configured to determine whether the respective ones of the set of vehicles have characteristics that satisfy the one or more inclusion parameters. For vehicles of the set that satisfy the one or more inclusion parameters, the one or more computers are configured to establish respective secure connections between the one or more computers and a controller area network (CAN) bus or an on-board diagnostic (OBD) interface of the respective ones of the vehicles that satisfy the one or more inclusion parameters and collect data from the respective ones of the set of vehicles that satisfy the one or more inclusion parameters via the secure connection.

For example, a client of a vehicle information service, such as a vehicle parts manufacturer, may specify, via a get vehicle data API, inclusion parameters for vehicles to include in a vehicle fleet and a minimum sample size of the vehicle fleet. The client may further specify what types of vehicle information are to be collected from the vehicles of the vehicle fleet, such as data related to parts manufactured by the vehicle parts manufacturer, as an example. In some embodiments, the client may further specify whether vehicle parts and performance information is to be collected, such as which parts are on the vehicle and associated data, such as miles in service, hours of service, status (e.g. failed or not-failed), etc., whether vehicle probe data is to be collected, such as engine temperature, oil pressure, tire pressure, etc., or whether usage history data is to be collected, such as acceleration rates, turning speed and radius, oil change history, deceleration rates, etc. Continuing the example, the client of the vehicle information service may then receive a notification when the requested vehicle fleet information has been collected in accordance with the inclusion parameters and sample size specified by the client. The notification may be sent via a data retriever API of the vehicle information service and the client may then access the collected vehicle fleet information via the data retriever API. In some embodiments, the client may download the collected vehicle information, remotely access the collected vehicle information stored on the one or more computers of the vehicle information service, or access a graphical user interface that presents the collected vehicle fleet information and/or statistical information derived from the collected vehicle fleet information. For example, in some embodiments, a graphical user interface may include a replica of a representative vehicle of the vehicle fleet, and a client may interact with various component parts of the representative vehicle via the graphical user interface to access statistical information related to a particular selected component parts of vehicles of the vehicle fleet.

In some embodiments, a method includes receiving, from a client of a vehicle information service, a set of one or more inclusion parameters for vehicles to be included in a vehicle fleet from which data is to be collected. The method also includes receiving, from the client, a minimum sample size that defines a minimum number of vehicles to collect data from that satisfy the one or more inclusion parameters, wherein the one or more inclusion parameters and the minimum sample size are received from the client via a first application programmatic interface (API) implemented on one or more computers of a provider network that implements the vehicle information service. Additionally, the method includes establishing respective connections between networking devices of the provider network and respective ones of a set of vehicles and determining whether the respective ones of the set of vehicles have characteristics that satisfy the one or more inclusion parameters. Furthermore, the method includes, for vehicles of the set that satisfy the one or more inclusion parameters, establishing respective secure connections between the one or more computers of the provider network and respective vehicle data communication buses of the respective ones of the vehicles that satisfy the one or more inclusion parameters and collecting data from the respective ones of the set of vehicles that satisfy the one or more inclusion parameters via the respective secure connections. Also, the method includes notifying the client, via a second API implemented on the one or more computers of the provider network, that data has been collected from the minimum sample size of vehicles of the vehicle fleet.

In some embodiments, one or more non-transitory computer-readable media store instructions that, when executed on or across one or more processors, cause the one or more processors to implement a first application programmatic interface (API) and a second API. The first API is configured to receive, from a client of a vehicle information service, a set of one or more inclusion parameters for vehicles to be included in a vehicle fleet from which data is to be collected and receive, from the client, a minimum sample size for the vehicle fleet, wherein the minimum sample size defines a minimum number of vehicles to collect data from that satisfy the one or more inclusion parameters. The second API is configured to send a notification to the client in response to data being collected from the minimum number of vehicles of the vehicle fleet and provide, to the client, access to a data set comprising data collected from the minimum number of vehicles of the vehicle fleet.

Some vehicles may be designed to allow access to vehicle usage information via connecting a physical tool, such as a diagnostic tool, to an on-board diagnostic interface. However, such methods of collecting vehicle usage information may require the vehicle to be brought into a service center and physically connected to the diagnostic tool. Thus limiting the utility of such methods for collecting vehicle usage information from a large number of vehicles, such as may be included in a vehicle fleet.

Additionally, some vehicles may include pre-programmed hardware that allows minimal types of vehicle information to be sent to the original equipment manufacturer (OEM). For example, a vehicle may support a web-based set of features to remotely start the vehicle, or unlock the doors of the vehicle, as a few examples. As part of these features certain types of vehicle information may be sent to the OEM according to pre-programmed instructions and then relayed from the OEM to a vehicle owner, such as a confirmation sent over the internet that the vehicle has started in response to a request for remote start, or a confirmation sent over the internet that the doors have been locked in response to a request to lock the doors. However, such status information may be provided in limited circumstances and for limited types of vehicle usage information, such as only in response to a request and only in regard to the request, e.g. a request for remote start or a request to lock the doors. Furthermore, the circumstances in which such information is provided and the types of information provided may be limited by the pre-programmed hardware installed on the vehicle. Moreover, such features may not be particularly useful for collecting vehicle status information from a large number of vehicles of a vehicle fleet.

In some embodiments, a vehicle information service may be used to collect vehicle status information from a large number of vehicles, such as a fleet of vehicles. The vehicle information service may include one or more networking devices configured to remotely (e.g. over the internet or via a wireless network) contact a plurality of vehicles and query the vehicles to determine general characteristics of the vehicles, such as make, model, year, etc. In some embodiments the vehicle information service may additionally or alternatively maintain a database comprising characteristics of participating vehicles, such as make, model, year, etc.

In some embodiments, the vehicle information service may query the plurality of vehicles for additional information such as metadata indicating details regarding component parts of the vehicles, such as a parts manufacturer, part type, part model number, part year of manufacture, etc. In some embodiments the vehicle information service may additionally or alternatively maintain a database comprising part information of participating vehicles, such as part manufacturer, part type, part model number, part year of manufacture, etc.

In some embodiments, OEMs may grant the vehicle information service access to an OEM data channel of the vehicles as part of participation in the vehicle information service. In some embodiments, a vehicle information service provides a software download to a participating vehicle, wherein the software download comprises program instructions for a vehicle data client application that executes as part of an operating system of the participating vehicle. The vehicle data client application may include a digital certificate that is used to verify the identity and authenticity of a communication received from the vehicle information service. For example, a vehicle information service may attempt to contact a participating vehicle by initiating a hand-shake and sending a corresponding digital certificate or key to the vehicle data client application to verify the authenticity and identify of the communication from the vehicle information service.

In some embodiments, the vehicle information service may initiate a session with the vehicle data client application executing as part of the vehicle operating system of the participating vehicle using a persistent protocol, such as a MQTT protocol (message queuing telemetry transport protocol). Additionally, the vehicle data client application may access a vehicle communication bus to obtain requested vehicle usage information. For example, the vehicle data client application may access a port that allows the vehicle data client application to pull requested data from a controller area network (CAN) bus of the participating vehicle. Additionally or alternatively, the vehicle data client application may utilize a port of an on-board diagnostic interface of a participating vehicle to pull the requested data. The vehicle data client application may then encrypt the collected data and send the encrypted collected data over a secure channel back to the vehicle information service. For example, an encrypted communication channel may be established between a networking device and/or computer of a provider network implementing the vehicle information service and a computing device of the participating vehicle that executes the vehicle data client application. The vehicle data client application may obtain requested vehicle usage information, as discussed above, and send the collected vehicle usage information back to the vehicle information service over the encrypted communication channel established between the vehicle data client application and the networking device and/or computer of a provider network implementing the vehicle information service.

In some embodiments, a vehicle information service may allow a client to collect vehicle data from a large number of vehicles having parameters specified by the client. For example, a client may specify inclusion parameters such as make, model, year, part manufacturer, party type, part model number, part year of manufacture, etc. The vehicle information service may then identify a fleet of vehicles satisfying the client specified inclusion parameters. Furthermore, the client may specify a minimum sample size, such as a minimum number of vehicles required for the vehicle fleet or a percentage of all vehicles satisfying the inclusion parameters from which vehicle usage information is to be collected. For example, the client may specify that the vehicle fleet is to include at least 1,000 vehicles, or the client may specify that vehicle usage information is to be collected from at least 80% of known vehicles in a given region satisfying the inclusion parameters, wherein 80% of the known vehicles constitutes the minimum sample size.

In some embodiments, a client may further place restrictions on when and how participating vehicles are to be contacted to collect vehicle usage information. For example, the client may specify that the vehicles are to be contacted during off-peak hours or only when bandwidth usage is less than a threshold amount. For example, in some embodiments, a participating vehicle may provide a Wi-Fi hot spot for occupants of the vehicle, and the client may specify that such a vehicle is to only be contacted in the background such that the collection of vehicle usage information does not interfere with use of the Wi-Fi hot spot.

In some embodiments, a vehicle information service may initially contact a sub-set of a larger group of vehicles participating in the vehicle information service. The vehicle information service may determine which, if any, of the vehicles of the sub-set satisfy the client specified inclusion parameters. The vehicle information service may then collect vehicle usage information from the vehicles of the sub-set that satisfy the client specified inclusion parameters, and may repeat such a process for additional sub-sets of the participating vehicles until the minimum sample size has been reached.

In some embodiments, the vehicle data client application may be configured to only receive read-only messages via a port connection to a controller area network (CAN) bus of a participating vehicle. Thus, the vehicle data client application may not be configured to issue commands or write requests to component parts of the participating vehicle that are connected to the CAN bus. In some embodiments, a separate internet of things (IoT) software update service of a provider network that implements the vehicle information service may issue software updates to a vehicle using a software update protocol of the participating vehicle. In some embodiments, the IoT software update service may determine the software updates based on collected vehicle usage information. However, the software updates are not issued as commands over the CAN bus from the vehicle data client application, but are instead issued as software updates from the IoT software update service. In this way, unauthorized communications over the CAN bus are prevented. Furthermore, in some embodiments, a provider network may include a machine learning service that processes vehicle usage information collected from a vehicle information service and determines recommended software updates to be performed using the IoT software update service.

In some embodiments, multiple clients, such as multiple vehicle manufacturers or parts manufacturers, may enter into an agreement to share anonymized vehicle usage information with other ones of the multiple clients. For example, two manufacturers may use the same make and model of windshield wiper motor in their vehicles. Thus, the two manufacturers may agree to share windshield wiper motor performance data with each other. In some embodiments, the windshield wiper motor data may be aggregated into a data lake and anonymized, such that the two vehicle manufacturer clients can see statistical information or anonymized information about the performance of the windshield wiper motors in a larger sample size of vehicles than the vehicles of just one of the two manufacturers. However, the manufacturers may not be able to determine whether data for a given windshield wiper motor is from a vehicle of the manufacturer or the other manufacturer, as an example.

FIG. 1 illustrates a provider network that implements a vehicle information service, according to some embodiments.

In some embodiments, a system, such as system 100, includes a vehicle information service, such as vehicle information service 126. The vehicle information service may be implemented via one or more computing devices, networking devices, and/or data storage devices of a provider network, such as provider network 102. For example, vehicle information service 126 is implemented by computing devices 104 and stores data in data storage devices 106. Additionally, networking devices 108, 110, and 112 connect the vehicle information service 126 to vehicles 138, 140, 142, 144, 146, 148, and 150. Together the vehicles 138, 140, 142, 144, 146, 148, and 150 may constitute a vehicle fleet or multiple vehicle fleets. In some embodiments, any number of vehicles may participate in a vehicle information service and may be included in a set of participating vehicles.

In some embodiments, a provider network, such as provider network 102, may further be connected to one or more clients, such as client 132 and client 134, via an intermediate network, such as network 136. In some embodiments, network 136 may be a public network such as the internet, or a private network connection between the provider network and the clients 132 or 134.

In some embodiments, a vehicle information service, such as vehicle information service 126, may include various software components or modules. For example, vehicle information service 126 includes "get vehicle data" API 120, "data retriever" API 122, "client application download" API 124, vehicle connection manager 114, vehicle data analysis engine 116, and collected data repository 118.

In some embodiments, a client, such as client 132, may submit a vehicle fleet data request, such as vehicle fleet data request 128, to a vehicle information service, such as vehicle information service 126, via a "get vehicle data" API, such as "get vehicle data" API 120. The vehicle fleet data request may specify one or more inclusion parameters for vehicles from which data is to be collected which make up a vehicle fleet. Additionally, the vehicle fleet data request may specify a minimum sample size for the vehicle fleet. For example, vehicle fleet data request 128 includes a first inclusion parameter that vehicles of the vehicle fleet are to be model years 2015-2020 and a second inclusion parameter that vehicles of the vehicle fleet are to have a wiper sensor manufactured by manufacturer XYZ. Additionally, the vehicle fleet data request 128 specifies that the vehicle fleet is to include 1,000 vehicles. Thus, the vehicle fleet data request 128 is for the vehicle information service 126 to collect vehicle data from 1,000 vehicles with a model year of 2015-2020 and that include a wiper sensor manufactured by manufacturer XYZ. This vehicle fleet data request 128 is submitted to "get vehicle data" API 120 of vehicle information service 126 via network 136.

The vehicle information service 126, may then parse the vehicle fleet data request 128 and cause vehicle connection manager 114 to contact a first sub-set of vehicles participating in the vehicle information service. In some embodiments, collected data repository 118 may store data about participating vehicles, such as model year, or possibly wiper sensor manufacturer. In some embodiments, the vehicle connection manager 114 may strategically select vehicles to include in the sub-set of vehicles to contact by preemptively excluding vehicles known not to satisfy the inclusion parameters specified by the client.

In some embodiments, the vehicle connection manager 114 may collect general information from the vehicles included in the first sub-set of participating vehicles to be contacted. The vehicle connection manager 114, may further provide the collected general information to the vehicle data analysis engine 116. The vehicle data analysis engine 116 may determine which, if any, of the vehicles in the first sub-set satisfy the inclusion parameters based on the collected general information. Furthermore, in some embodiments, the vehicle data analysis engine may update an entry in the collected data repository for one or more of the participating vehicles based on the collected general information. This may allow for improved selections of sub-sets of vehicles to contact for future queries.

For vehicles of the sub-set that satisfy the one or more inclusion parameters, a vehicle data analysis engine, such as vehicle data analysis engine 116, may instruct a vehicle connection manager, such as vehicle connection manager 114, to establish respective secure connections between the one or more computers and/or networking devices implementing the vehicle information service and a communication bus of the vehicles satisfying the one or more inclusion parameters. In some embodiments, each of the participating vehicles, including the one or more vehicles that satisfy the one or more inclusion parameters, may execute a vehicle data client application that acts as an interface between the secure connection to the vehicle information service and the communication bus of a given one of the participating vehicles that satisfy the one or more inclusion parameters. For example, a participating vehicle may have been manufactured with a vehicle data client application installed as part of its operating system or may download the vehicle client data application, for example from "client application download" API 124. In some embodiments, the vehicle data client application may execute at the operating system level, which may be a lower level than other applications execute at, such as entertainment applications or navigations applications that execute at a higher level and are accessed via a user interface of the vehicle.

In some embodiments, the vehicle connection manager and the vehicle data analysis engine may repeat the process described above with additional sub-sets of vehicles until the minimum sample size is reached. In some embodiments, the data collected from the vehicles of the vehicle fleet may include vehicle component part data, such as what component parts are on the vehicle and a current state of the component parts (e.g. in-use, not in-use, operational, failed, etc.). In some embodiments, the data collected from the vehicles of the vehicle fleet may include vehicle sensor or probe data, such as temperatures, pressures, RPMs, speed, etc. In some embodiments, the data collected from the vehicles of the vehicle fleet may include vehicle operational data, such as gas pedal position, brake position, steering wheel orientation, acceleration history, braking history, turn radius history, average speed, average braking, average turn radius, or other statistical information stored by the vehicle, such as oil life, filter life, etc.

Once data has been collected from a fleet of vehicles satisfying the inclusion parameters and the minimum sample size, a "data retriever" API of the vehicle information service, such as "data retriever" API 122 of vehicle information service 126, may issue a notification to the requesting client that the data has been collected from the vehicles of the vehicle fleet as specified in the vehicle fleet data request. For example, "data retriever" API 122 may issue notification 152 to client 132 indicating that the requested data has been collected. The client 132 may then access the collected data via data retriever API 122.

In some embodiments, the collected data may come from various vehicle components, such as a location GPS probe, sensors, cameras, switches, lights, wipers, gauges, etc. of the vehicle.

In some embodiments, a vehicle information service, such as vehicle information service 126, may be part of a larger vehicle software development kit (SDK) that a vehicle manufacturer or vehicle parts manufacturer may utilize to design software for the vehicle or for a vehicle part. For example, a vehicle manufacturer may utilize collected data from a vehicle information service to test and analyze various software solutions under development.

In some embodiments, a vehicle fleet data request may include any number of inclusion parameters. For example, vehicle fleet data request 130 includes four inclusion parameters and a minimum sample size, whereas vehicle fleet data request 128 included fewer vehicle inclusion parameters. In some embodiments, each client may customize a search via a vehicle fleet data request. Also, in some embodiments, a client may utilize one or more vehicle fleet data requests templates for common requests. In some embodiments, a vehicle fleet data request may define which vehicles are to be included in a vehicle fleet from which vehicle usage information (e.g. data) is to be collected and may further define what types of data are to be collected. In some embodiments, only requested data may be collected from vehicles of a vehicle fleet despite other types of data being available. For example, a tire manufacturer may request tire pressure information for vehicles with a particular make, model, and year range, but may not request oil pressure. In such a situation, a vehicle information service may collect the tire pressure information but not the oil pressure information.

Figure 2:
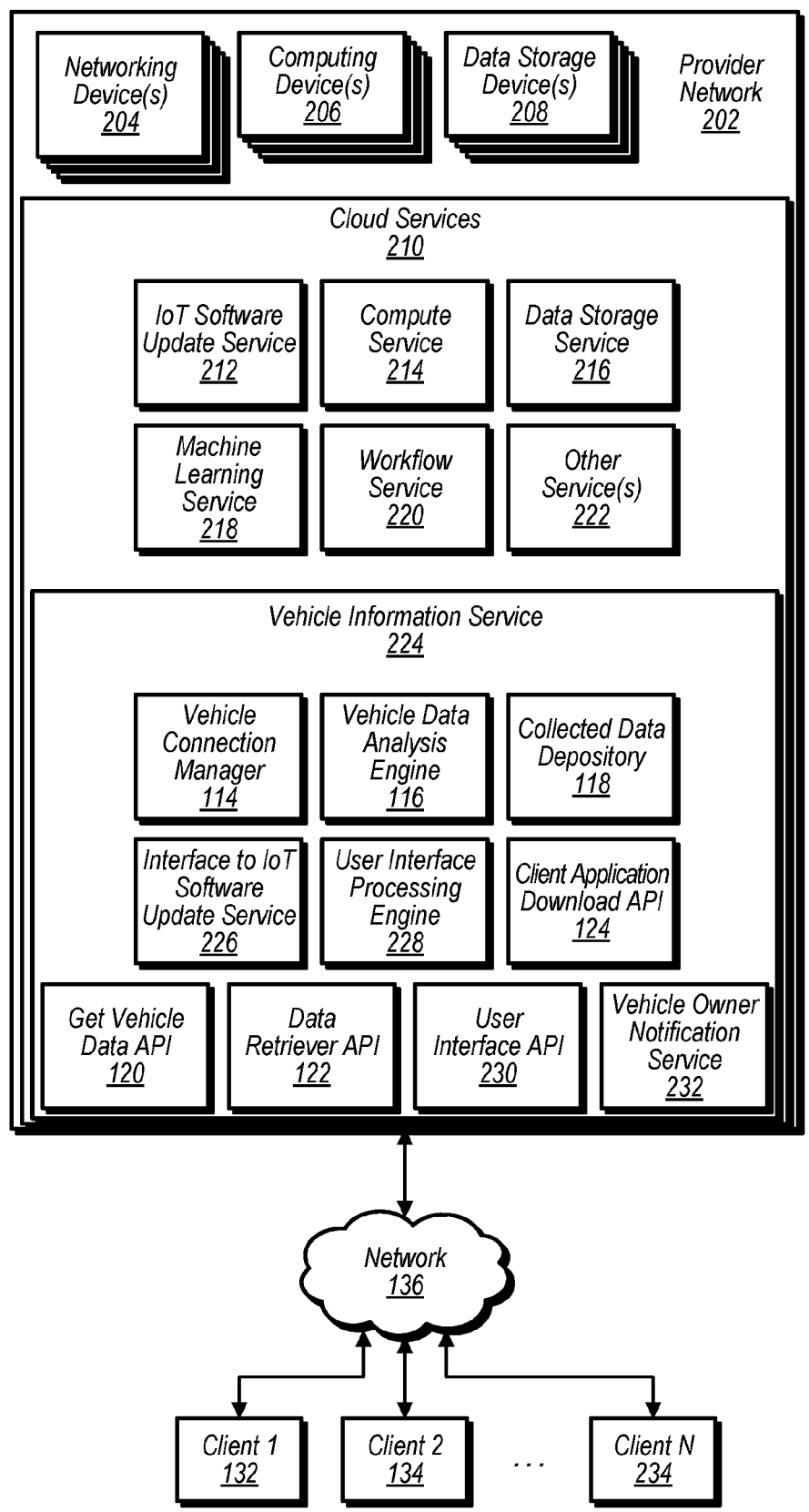
FIG. 2 illustrates a more detailed view of components of a provider network that implements a vehicle information service and a more detailed view of components of the vehicle information service, according to some embodiments.

FIG. 2 illustrates a more detailed view of components of a provider network that implements a vehicle information service and a more detailed view of components of the vehicle information service, according to some embodiments.

In some embodiments, a provider network, such as provider network 202, includes networking devices 204, computing devices 206, and data storage devices 208 that implement cloud services 210. In some embodiments, a provider network may implement a plurality of cloud services in addition to a vehicle information service. For example, provider network 202 implements cloud services 210 that include IoT software update service 212, compute service 214, data storage service 216, machine learning service 218, workflow service 220, and other services 222. Cloud services 210 also includes vehicle information service 224.

In some embodiments, an IoT software update service, such as IoT software update service 212, may facilitate software updates on devices connected to the IoT software update service, such as vehicles 138, 140, 142, 144, 146, 148, and 150 as illustrated in FIG. 1. In some embodiments, an IoT software update service may additionally update firmware on a connected device and may utilize encrypted communications to perform the update. In some embodiments, the IoT software update service may also include identity authentication protocols to prevent unauthorized entities from altering software on a connected device, such as a vehicle, and encrypt communications to the connected device to prevent alterations to the software updates.

In some embodiments, a compute service, such as compute service 214, may include computing devices that implement virtual compute machines that may be used to analyze collected vehicle usage information and/or may be used to implement a vehicle information service.

In some embodiments, a data storage service, such as data storage service 216, may include data storage devices that implement a virtualized data storage, such as virtual data storage volume or virtual storage containers for an object-based storage. In some embodiments, a data storage service, such as data storage service 216, may be used to store collected vehicle usage information for a client. Also, in some embodiments, a data storage service, such as data storage service 216, may be used to implement a vehicle information service. For example, in some embodiments collected data repository 118 may be implemented using virtual storage resources of data storage service 216.

In some embodiments, a machine learning service may execute one or more machine learning algorithms to optimize one or more processes of a vehicle information service, a workflow service, or other service. For example, in some embodiments, a machine learning service, such as machine learning service 218, may be used to optimize control software for a vehicle component part and may utilize collected vehicle usage information from a vehicle information service, such as vehicle information service 224, to perform such machine learning. In some embodiments, a machine learning service may learn anomalies, such as a handling performance on a slippery road and indicators of the slippery road, such as windshield wiper engagement, and may cause an IoT software update service, such as IoT software update service 212, to update suspension or braking software or set points to perform differently when the windshield wiper is engaged.

In some embodiments, a workflow service, such as workflow service 220, may execute a workflow based on input data and a stored or developed workflow. For example, in some embodiments, a workflow service, such as workflow service 220, may determine actions to be taken based on collected vehicle usage information. As an example, a workflow service may determine a filter, hose, or fluid needs to be changed or replaced based on applying collected vehicle usage information to one or more stored or developed work flows. In some embodiments, a machine learning service, such as machine learning service 218, may be used to develop or improve work flows executed by workflow service 220. For example, in some embodiments, a workflow service, such as workflow service 220, may determine one or more preventative maintenance or other actions need to be taken, and a vehicle notification service of a vehicle information service, such as vehicle notification service 232 of vehicle information service 224, may issue a notification to an owner of a vehicle, or a responsible party for the vehicle, to perform the action, such as preventative maintenance.

In some embodiments, cloud services 210 may include various other cloud services, such as other services 222.

In some embodiments, a vehicle information service, such as vehicle information service 102 illustrates in FIG. 1 or vehicle information service 224 illustrated in FIG. 2, may include additional components, such as an interface to an IoT software update service/interface to a machine learning service, such as interface to IoT software update service 222. In some embodiments, such an interface may provide collected data to a software update service and/or a machine learning service, such as IoT software update service 212 or machine learning service 218.

Figure 6:
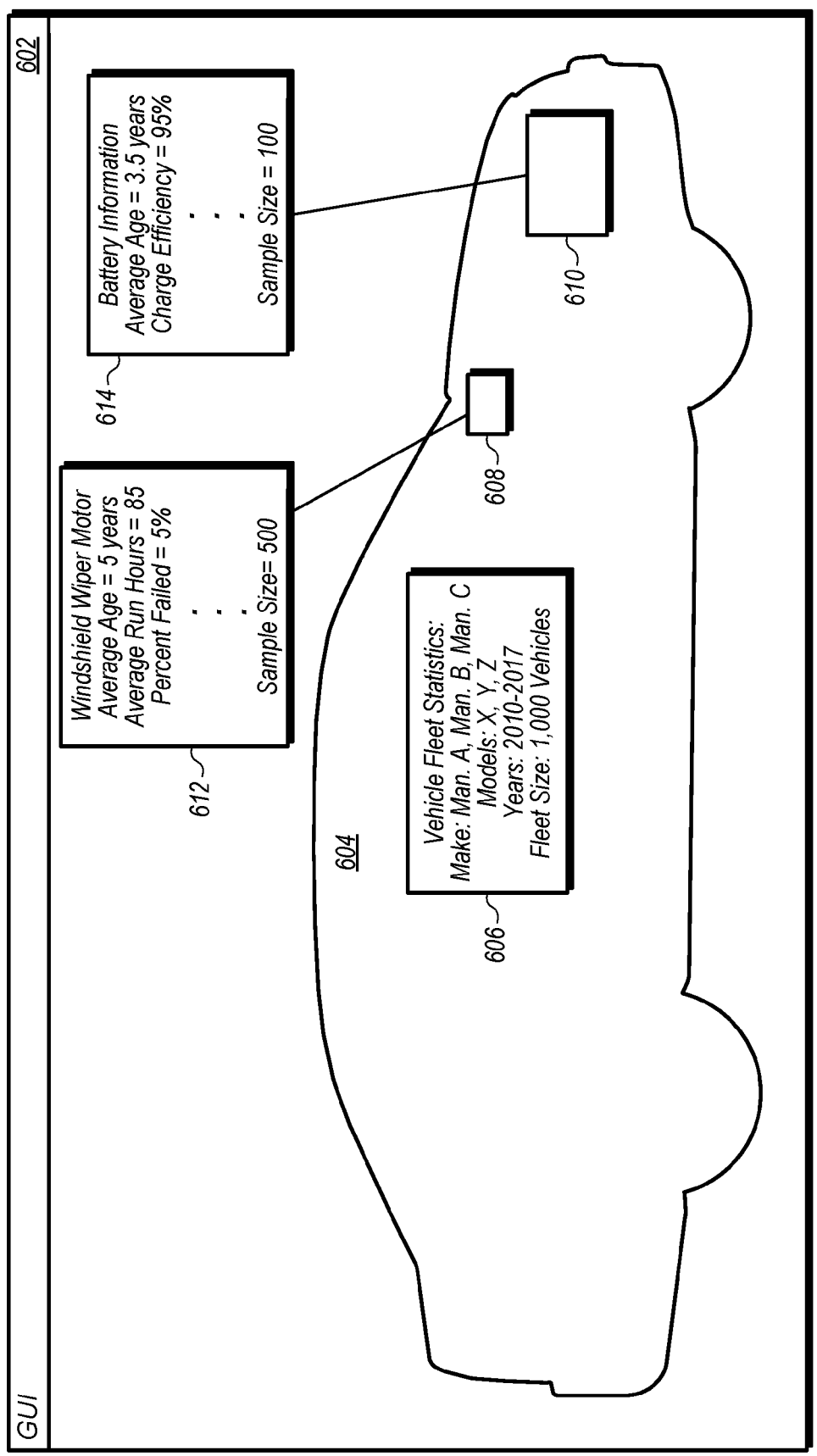
FIG. 6 illustrates an example graphical user interface for presenting collected vehicle fleet information, according to some embodiments.

In some embodiments, a vehicle information service, such as vehicle information service 102 or 224, may include a user interface processing engine, such as user interface processing engine 228. In some embodiments, a user interface processing engine may perform statistical analysis on collected vehicle usage information and/or anonymize collected vehicle usage information. In some embodiments, a vehicle information service, such as vehicle information service 102 or 224, may further include a user interface API, such as user interface API 230. In some embodiments, a user interface API may implement a user interface for accessing collected vehicle usage information, such as a graphical user interface as illustrated in FIG. 6, or other interface.

In some embodiments, a vehicle information service, such as vehicle information service 102 or 224, may include a vehicle notification service, such as vehicle notification service 232. In some embodiments, a vehicle notification service may send preventative maintenance recommendations to a vehicle owner and/or may send repair recommendations to a service technician working on a particular vehicle, wherein the preventative maintenance recommendations and the repair recommendations are determined based on collected vehicle usage information.

In some embodiments, any number of clients may utilize a vehicle information service, such as vehicle information service 102 or 224. For example clients 132, 134 through 234 may utilize vehicle information service 224. In some embodiments, any or all of the clients may opt-in to allowing data collected on their behalf to be added to a data lake maintained in collected data depository 226 and from which anonymized data is provided to a client, such as in the form of statistical data for particular parts or vehicle operational conditions.

Figure 3:
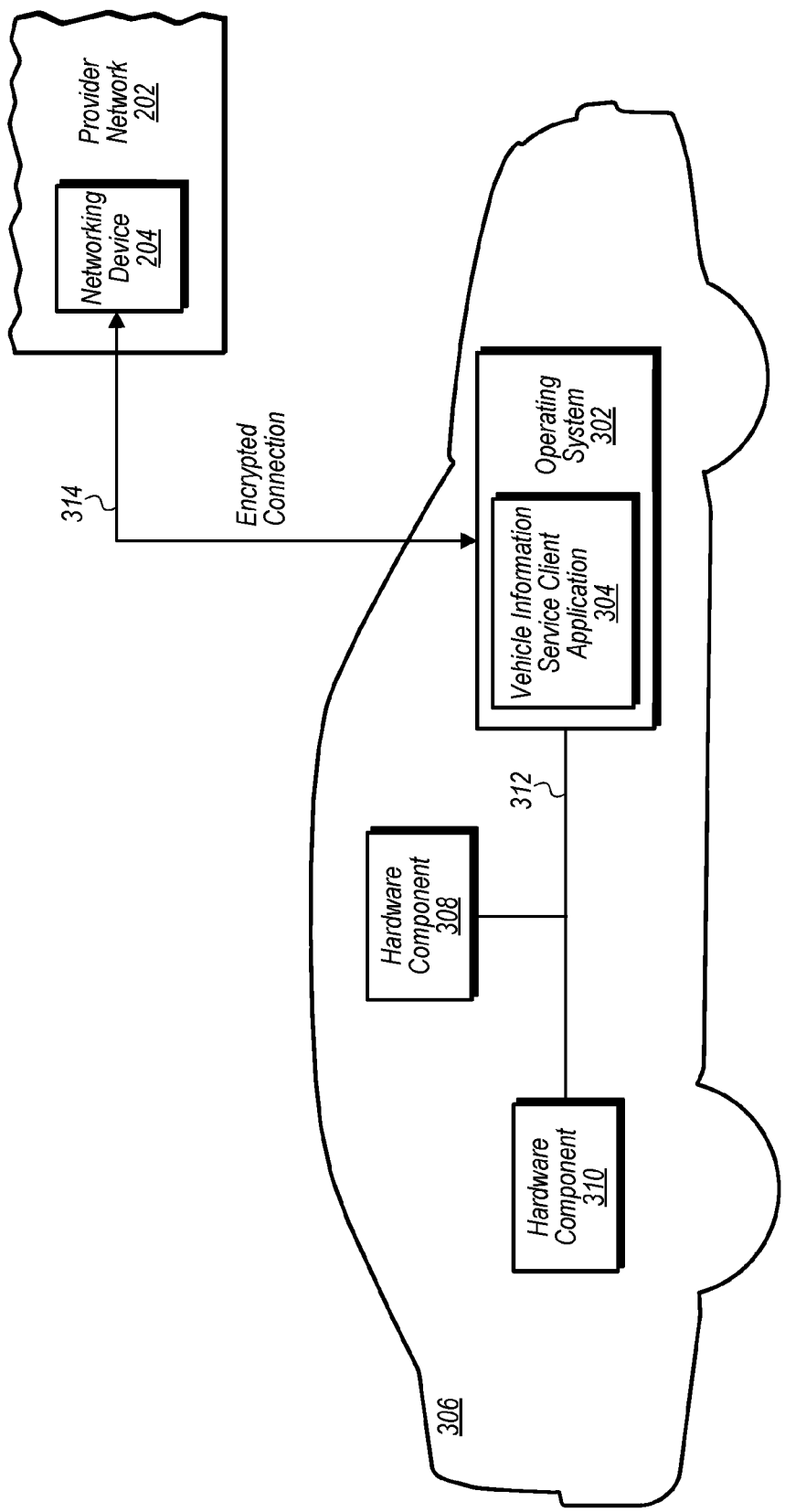
FIG. 3 illustrates communications between a vehicle information service, a client application executing on a vehicle, and components of the vehicle, according to some embodiments.

FIG. 3 illustrates communications between a vehicle information service, a client application executing on a vehicle, and components of the vehicle, according to some embodiments.

In some embodiments, a vehicle information service, such as vehicle information service 126 or vehicle information service 224, establishes a secure connection 314 with a vehicle data client application 302 via a networking device 204 of the provider network 202, and/or one or more networking devices of an intermediate network such as the internet, a cellular network, a satellite connection, etc., for example of intermediate network 136. For example, networking device 204 establishes a secure connection with vehicle data client application 304 operating as a part of operating system 302 of vehicle 306.

In some embodiments, vehicle information service client application 304 functions as an interface between a controller area network (CAN) of a vehicle, such as controller area network 312 of vehicle 306, and a vehicle information service, such as vehicle information service 126 or 224. In some embodiments, operating system 302 sends commands to component parts of vehicle 306, such as hardware components 308 and 310 via the controller area network 312. Additionally, operating system 302 may receive feedback information from hardware components 308 and 310 via controller area network 312. For example, sensor readings, component status information, etc., may be communicated back to operating system 302 via controller area network 312. In some embodiments, a vehicle information service client application, such as vehicle information service client application 304, may execute at a lower level in operating system 302 than other applications such as a mapping application. Due to this, the vehicle information service client application may have access to data from controller area network 312 that is not available at higher levels. Also, in some embodiments, a vehicle information service client application, such as vehicle information service client application 304, may interact with an on-board diagnostic interface (OBD) of operating system 302 to access vehicle usage information. In some embodiments, a vehicle manufacture may have configured operating system 302 to allow vehicle information service client application 304 to pull data from a restricted port that allows access to an on-board diagnostic (OBD) interface or a controller area network (CAN).

In some embodiments, a vehicle information service may verify the identity of a connected vehicle, such as vehicle 306, when the vehicle connects to the vehicle information service. A hand-shake may then take place and a persistent session may be initiated for example via a message queuing telemetry transport protocol (MQTT protocol). In some embodiments, an operating system, such as operating system 302, may only allow vehicle information service client application 304 to receive read-only messages, but may restrict vehicle information service client application 304 from issuing write requests or commands. In some embodiments, vehicle information service client application 304 may decrypt incoming requests for vehicle usage information from a vehicle information service, such as vehicle information service 126 or 224, and may encrypt collected vehicle usage information before transmitting the collected vehicle usage information to provider network 202 via networking device 204 and to the vehicle information service, such as vehicle information service 126 or 224.

Figure 4:
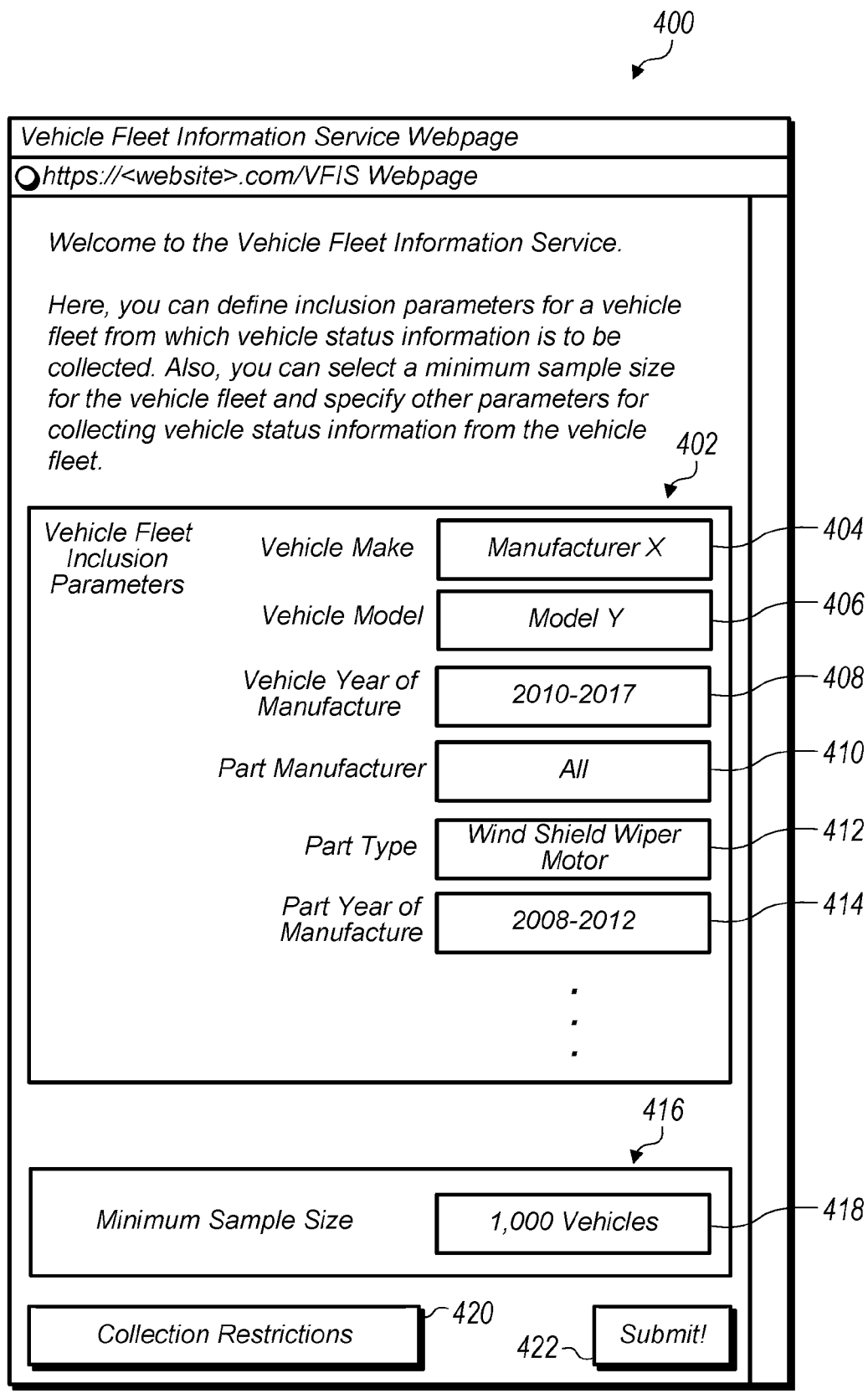
FIG. 4 illustrates an example user interface of a vehicle information service for requesting vehicle fleet information, according to some embodiments.

FIG. 4 illustrates an example user interface of a vehicle information service for requesting vehicle fleet information, according to some embodiments.

Interface 400 includes an inclusion parameter selection area 402 and illustrates various inclusion parameters 404, 406, 408, 410, 412, and 414 that a client may select to define a vehicle fleet. In some embodiments, a client may add more inclusion parameters or may use fewer inclusion parameters to define a vehicle fleet. For example, in inclusion parameter selection area 402, the client has defined the vehicle fleet to include vehicles manufactured by manufacturer X and of model Y with years of manufacturer of 2010 to 2017. The client has also defined the vehicle fleet to include vehicles with windshield wiper motors manufactured from 2008 to 2012. In some embodiments, other inclusion parameters may be selected, such as combinations of parts (e.g. vehicles with windshield wiper motor XYZ and rain sensor ABC, etc.). In some embodiments geographical areas within which the vehicles of the vehicle fleet are to reside, trim levels, software versions, etc. may be defined via inclusion parameters specified by the client. Additionally, interface 400 includes sample size selection area 416 wherein the client has entered a sample size of 1,000 vehicles into box 418.

In some embodiments, an interface to a vehicle information service, such as interface 400, may further include an option to define restrictions for collection of vehicle usage information or vehicle data from the fleet of vehicles. For example, interface 400 includes collection restriction selection link 420. In some embodiments, a client may set restrictions such as a time window within which participating vehicles are to be contacted, a maximum number of times in a given time period participating vehicles are to be contacted, a spare bandwidth amount that is required for a participating vehicle to be available to be contacted, etc.

In some embodiments, in order to initiate the collection of the requested vehicle usage information or vehicle data from vehicles satisfying the inclusion parameters, the client may select a submit button, such as submit button 422. In some embodiments, the vehicle information service may then manage the collection of the requested vehicle usage information or data, on behalf of the client, from vehicles that satisfy the inclusion parameters, e.g. the vehicle fleet. Additionally, the vehicle information service may notify the client when the requested vehicle usage information or data has been collected. The client may then access the collected data.

Figure 5:
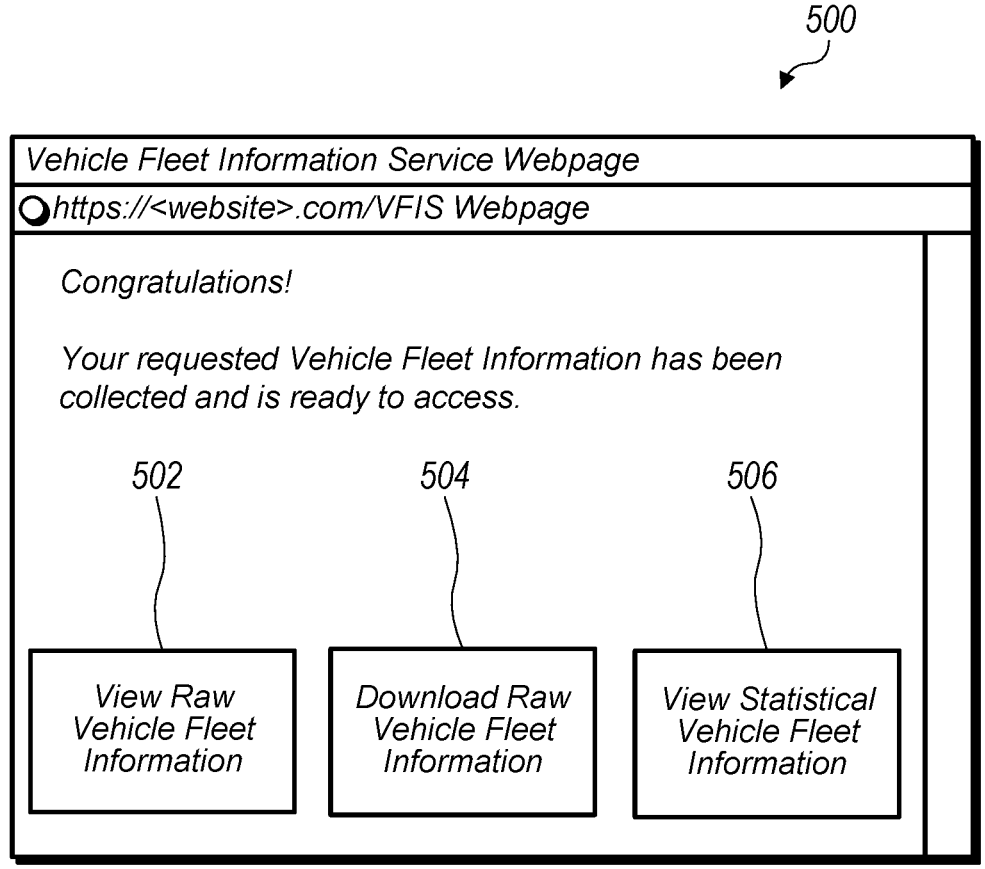
FIG. 5 illustrates an example user interface of a vehicle information service for accessing collected vehicle fleet information, according to some embodiments.

FIG. 5 illustrates an example user interface of a vehicle information service for accessing collected vehicle fleet information, according to some embodiments.

In some embodiments, a client may access collected data in various ways. For example, interface 500 includes a view raw vehicle fleet information option 502, a download raw vehicle fleet information option 504, and a view statistical vehicle fleet information option 506. For example, in some embodiments, a client may view or download raw collected vehicle fleet information which may include the collected vehicle fleet information in tabular form, text form, etc. In some embodiments, a vehicle information service may perform analysis on the collected vehicle information and provide refined views of the collected vehicle usage information, such as statistical data derived from the raw collected data, filtered data, etc. In some embodiments, analyzed collected vehicle usage information may be presented to a client via a graphical user interface, as an example.

FIG. 6 illustrates an example graphical user interface for presenting collected vehicle fleet information, according to some embodiments.

Graphical user interface 602 includes replica vehicle illustration 604 that includes representative component parts illustrations 608 and 610. For example, representative component part illustration 608 may represent a windshield wiper motor and representative component part illustration 610 may represent a battery. In some embodiments, the graphical user interface (GUI) 600 may be configured such that when a user hovers a pointer over, or interacts with, representative component parts illustrations 608 and 610, information boxes 612 and 614 are presented which may include vehicle usage information for the corresponding component part or statistical information for the corresponding component part derived from collected vehicle data for the component part. Additionally, GUI 600 may include an information box for the vehicle fleet, such as information box 606. In some embodiments, statistical information included in the information boxes 606, 612, and 614 may be based solely on the collected vehicle usage information collected on behalf of a client in response to a particular vehicle fleet data request. In some embodiments, the statistical information may be based on vehicle usage information collected on behalf of the client in response to a particular vehicle fleet data request and one or more prior vehicle fleet data requests. Also, in some embodiments, clients may opt-in to sharing anonymized data with other clients of the vehicle information service. Thus, in such embodiments, the statistical information included in the boxes, 606, 612, and 614 may be based on vehicle usage information collected for other clients that also satisfy the inclusion parameters specified by a particular client viewing the GUI 600.

Figure 7:
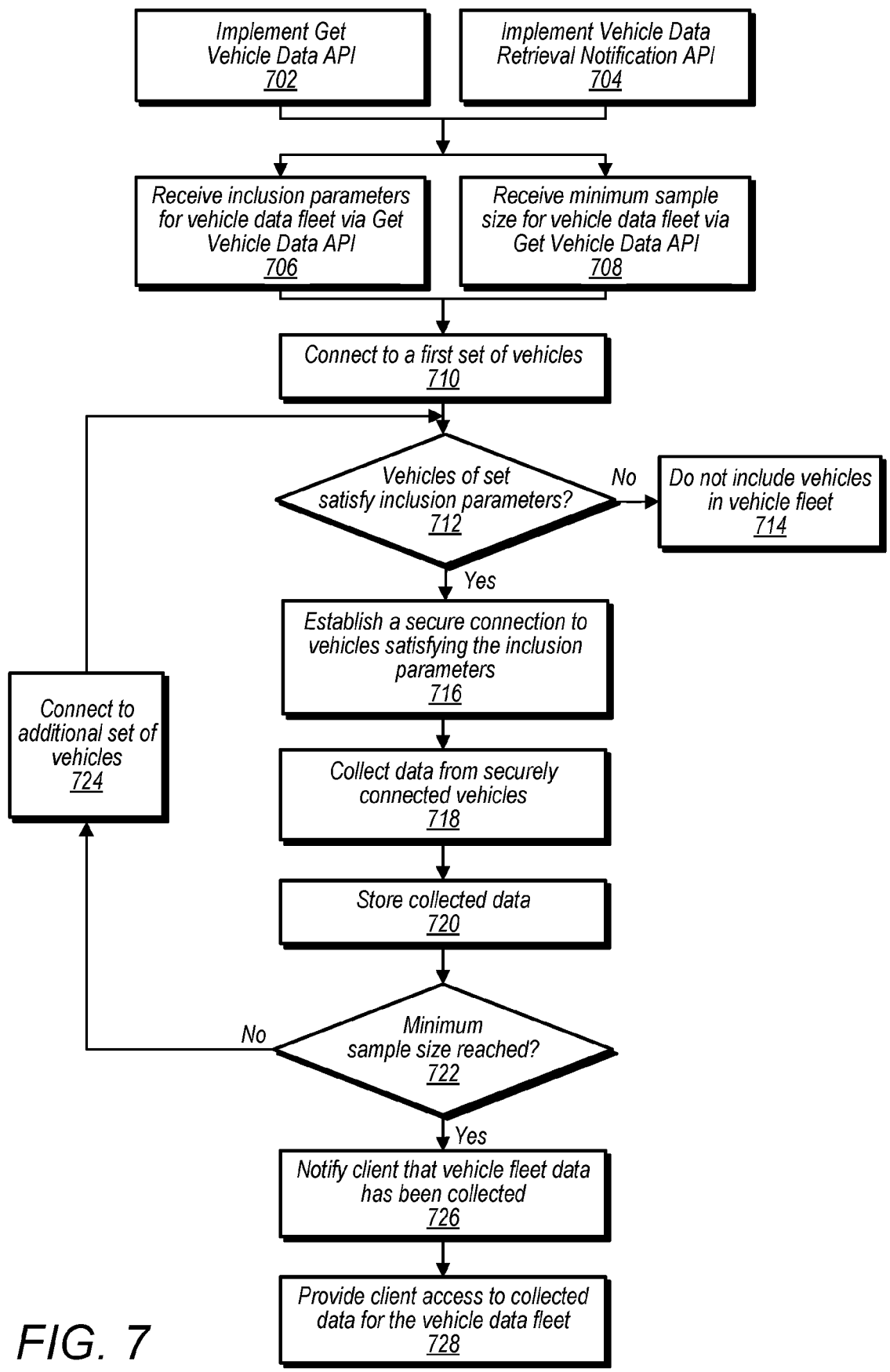
FIG. 7 illustrates a process of requesting and collecting vehicle information from a vehicle fleet via a vehicle information service, according to some embodiments.

FIG. 7 illustrates a process of requesting and collecting vehicle information from a vehicle fleet via a vehicle information service, according to some embodiments.

At 702, a vehicle information service implements a "get vehicle data" API, such as "get vehicle data" API 120. At 704, the vehicle information service also implements a "vehicle data retrieval notification" API, such as "data retriever" API 122.

At 706, the vehicle information service receives a set of one or more inclusion parameters for vehicles to be included in a vehicle fleet from which vehicle information is to be collected. The inclusion parameters may be received via the "get vehicle data" API, for example such as vehicle fleet data request 128 or 130, or via user interface 400. In a similar manner, at 708, the vehicle information service receives a minimum sample size for the vehicle fleet.

At 710, the vehicle information service connects to a first set of vehicles, for example via a vehicle connection manager, such as vehicle connection manager 114, and one or more networking devices of a provider network, such as networking devices 108, 110, and/or 112. In some embodiments, different ones of the networking devices may establish connections with different sub-sets of a plurality of vehicles participating in the vehicle information service. In some embodiments, to establish a connection, a connection manager may initiate a communication session between the connection manager and the first set of vehicles. Also, in some embodiments, to establish a connection, a connection manager may broadcast a request for information to the first set of vehicles, such as in a beacon type message, and receive responses from the vehicles of the first set of vehicles. In some embodiments, the beacon message may request that vehicles satisfying the one or more inclusion parameters send a response, and in such cases, responses may be received from a sub-set of the first set of vehicles that satisfy the one or more inclusion parameters. In other embodiments, in which a communication session is established, the connection manager may query the vehicles of the first set of vehicles regarding characteristics of the vehicles applicable to the one or more inclusion parameters for the vehicle fleet via the communication session. In some embodiments, vehicles participating in the vehicle information service may have ongoing connections to the provider network, and in such cases, at 710 communication sessions between the vehicle connection manager and the vehicles of the first set of vehicles may be established via an ongoing connection between the vehicles of the first set of vehicles and the provider network.

At 712, the vehicle information service determines whether the vehicles of the first sub-set (or a next sub-set) satisfy the one or more inclusion parameters. For example, a vehicle data analysis engine, such as vehicle data analysis engine 116, may determine whether or not respective ones of the vehicles of the first sub-set satisfy the client's specified one or more inclusion parameters. If the vehicles do not satisfy the inclusion parameters, they may not be included in the vehicle fleet, for example at 714.

At 716, for the vehicles of the first sub-set that satisfy the one or more client specified inclusion parameters, the vehicle information service may establish a secure connection to the vehicles. For example, a vehicle connection manager, such as vehicle connection manager 114, may establish an encrypted connection between one or more computers and/or networking devices of a provider network that implements the vehicle information service and an on-board computer of the respective vehicles that executes a local operating system for the respective vehicles that includes a vehicle information service client application, such as via encrypted connection 314 illustrated in FIG. 3 between networking device 204 and vehicle information service client application 304 executing as part of operating system 302.

At 718, the vehicle information service may collect vehicle usage information from the connected vehicles during a secure session, such as a MQTT session. In some embodiments, the vehicle information service may send data requests to the vehicle information service client application operating as part of the local operating system of one of the respective securely connected vehicles. The request may be encrypted. The vehicle information service client application may decrypt the encrypted request, and cause the requested data to be pulled through one or more ports to a communication bus of the vehicle such as a controller area network or via an on-board diagnostic interface. The vehicle information service client may then encrypt the collected information and return the collected encrypted information back to the vehicle information service via the secure connection during the secure session.

In some embodiments, at 720, the vehicle information service may store the collected data returned to the vehicle information service. In some embodiments, the collected data may be stored in an encrypted format or may be encrypted prior to being stored. For example, the collected vehicle usage information may be stored in a collected data depository of the vehicle information service, such as collected data depository 118.

At 722, a vehicle information service may determine whether vehicle usage information has been collected from a quantity of vehicles satisfying the client specified minimum sample size. If not, at 724, the vehicle information service may contact another sub-set of vehicles of the plurality of participating vehicles participating in the vehicle information service and may repeat 712-720 for the next sub-set of vehicles.

If the minimum sample size has been satisfied, at 726, the vehicle information service may notify the requesting client that the requested vehicle usage information or vehicle data has been collected from the vehicle fleet defined by the client specified inclusion parameters and sample size. At 728, the vehicle information service may provide access to the collected vehicle usage information or vehicle data, for example, via any of the mechanisms described herein, such as remote viewing of the collected vehicle usage information, downloading the collected vehicle usage information, or viewing representations derived from the collected vehicle usage information via a user interface, such as GUI 602.

Figure 8:
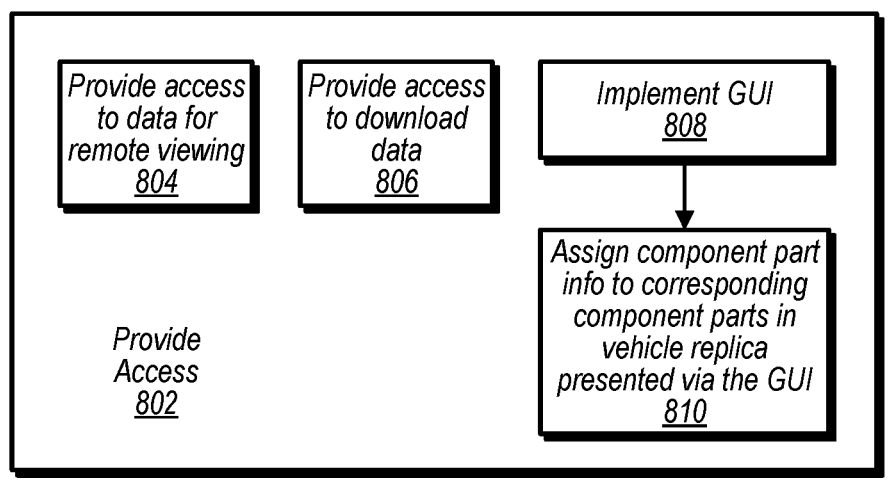
FIG. 8 illustrates additional details for providing access to collected vehicle information, according to some embodiments.

FIG. 8 illustrates additional details for providing access to collected vehicle information, according to some embodiments.

For example as discussed above, a providing access to the collected vehicle usage information step 802 may include providing access to data for remote viewing (804), providing access to download the collected data (806), or implementing a user interface (808) and assigning collected component part vehicle usage information or vehicle data to corresponding component parts of a vehicle replica illustrated in the user interface (810).

Figure 9A:
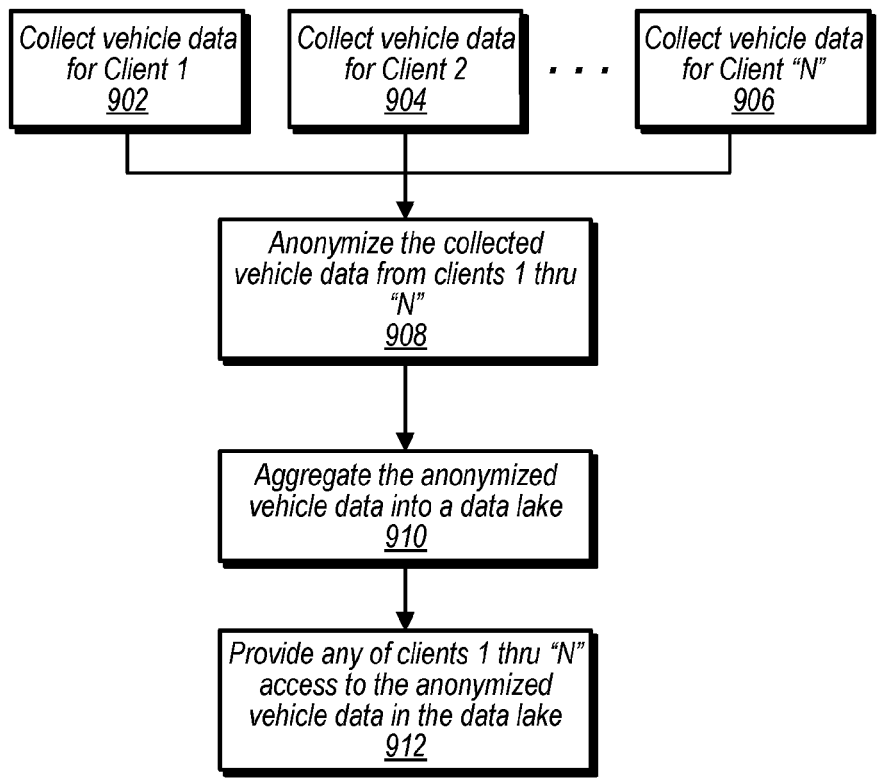
FIG. 9A illustrates an example process for collecting vehicle information from vehicle fleets for multiple clients, according to some embodiments.

FIG. 9A illustrates an example process for collecting vehicle information from vehicle fleets for multiple clients, according to some embodiments.

At 902, a vehicle information service collects vehicle data for client 1, at 904 the vehicle information service collects vehicle data for client 2, and at 906 the vehicle information service collects vehicle data for any number of additional clients "N". The data may be collected and stored in a similar manner as described herein, such as in FIG. 7.

At 908, the vehicle information service anonymizes the collected vehicle data for clients 1 through N. At 910, the vehicle information service aggregates the collected anonymized vehicle data for clients 1 through N into a data lake. In some embodiments, 908 and 910 may be performed concurrently, e.g. the vehicle data may be anonymized while being stored in the data lake. In some embodiments, anonymizing the collected vehicle data may remove personally identifying information from the collected data, such as a name of a vehicle owner, account number etc. In some embodiments, anonymizing the collected vehicle data may remove information that particularly identifies a unique vehicle and may instead only include information regarding characteristics of the vehicle that do not uniquely identify the vehicle. For example, a VIN number may be removed but data regarding make, model, year, parts included in the vehicle, status of the parts, etc. may remain in the dataset after the data is anonymized.

At 912, the vehicle information service provides any one clients 1 through N access to the anonymized data stored in the data lake. For example via the various methods described herein, such as in FIG. 8.

Figure 9B:
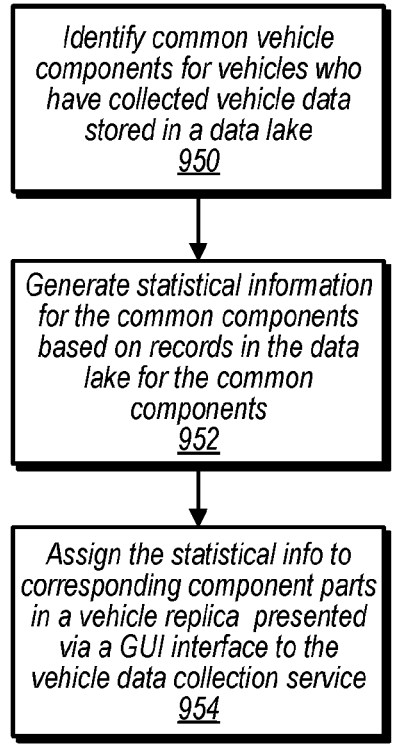
FIG. 9B illustrates an example process for presenting collected vehicle information using a graphical user interface, according to some embodiments.

FIG. 9B illustrates an example process for presenting collected vehicle information using a graphical user interface, according to some embodiments.

At 950, the vehicle information service identifies common vehicle components for vehicles who have collected data stored in the data lake (or a smaller data set). For example user interface processing engine 228 may identify common vehicle components for vehicles for which data has been collected.

At 952, the vehicle information service generates statistical information for the common components based on records in the data lake (or smaller data set) for the common components. For example, user interface processing engine 228 may determine statistical information for a common component, such as a battery, such as average battery charge, average battery life, standard deviation, etc.

At 954, the vehicle information service assigns the generated statistical information to a corresponding component part in a replica illustration of a user interface, such as is shown for GUI 602 illustrated in FIG. 6.

Figure 10:
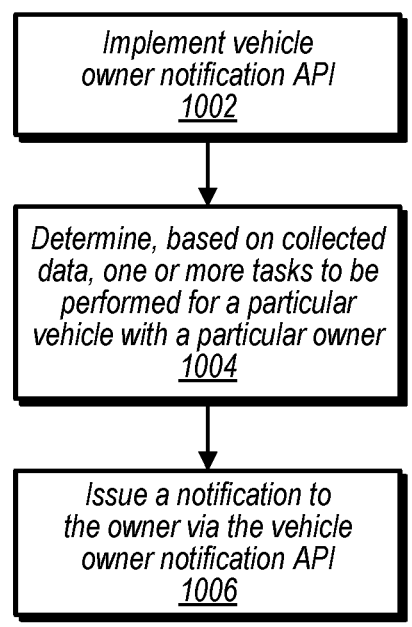
FIG. 10 illustrates an example process for implementing a customer notification component of a vehicle information service, according to some embodiments.

FIG. 10 illustrates an example process for implementing a customer notification component of a vehicle information service, according to some embodiments.

At 1002, a vehicle information service implements a "vehicle owner notification" API, such as may be used by vehicle owner notification service 232 illustrated in FIG. 2.

At 1004, the vehicle information service determines, based on collected data, one or more tasks to be performed for a particular vehicle with a particular owner. In some embodiments, the determination of the tasks may be performed in conjunction with a workflow service, such as workflow service 220, illustrated in FIG. 2.

At 1006, the vehicle information service issues a notification to the particular owner regarding a task to be performed for the particular vehicle. For example, the notification may be issued via a vehicle owner notification service, such as vehicle owner notification service 232.

In some embodiments, in addition to, or instead of, issuing a notification to the vehicle owner, a notification may be issued to another party, such as a repair technician. For example, a workflow may be executed on behalf of a vehicle information service using collected vehicle data and, the execution of the workflow may result in one or more tasks to be performed by a repair technician.

Example Computer System

Figure 11:
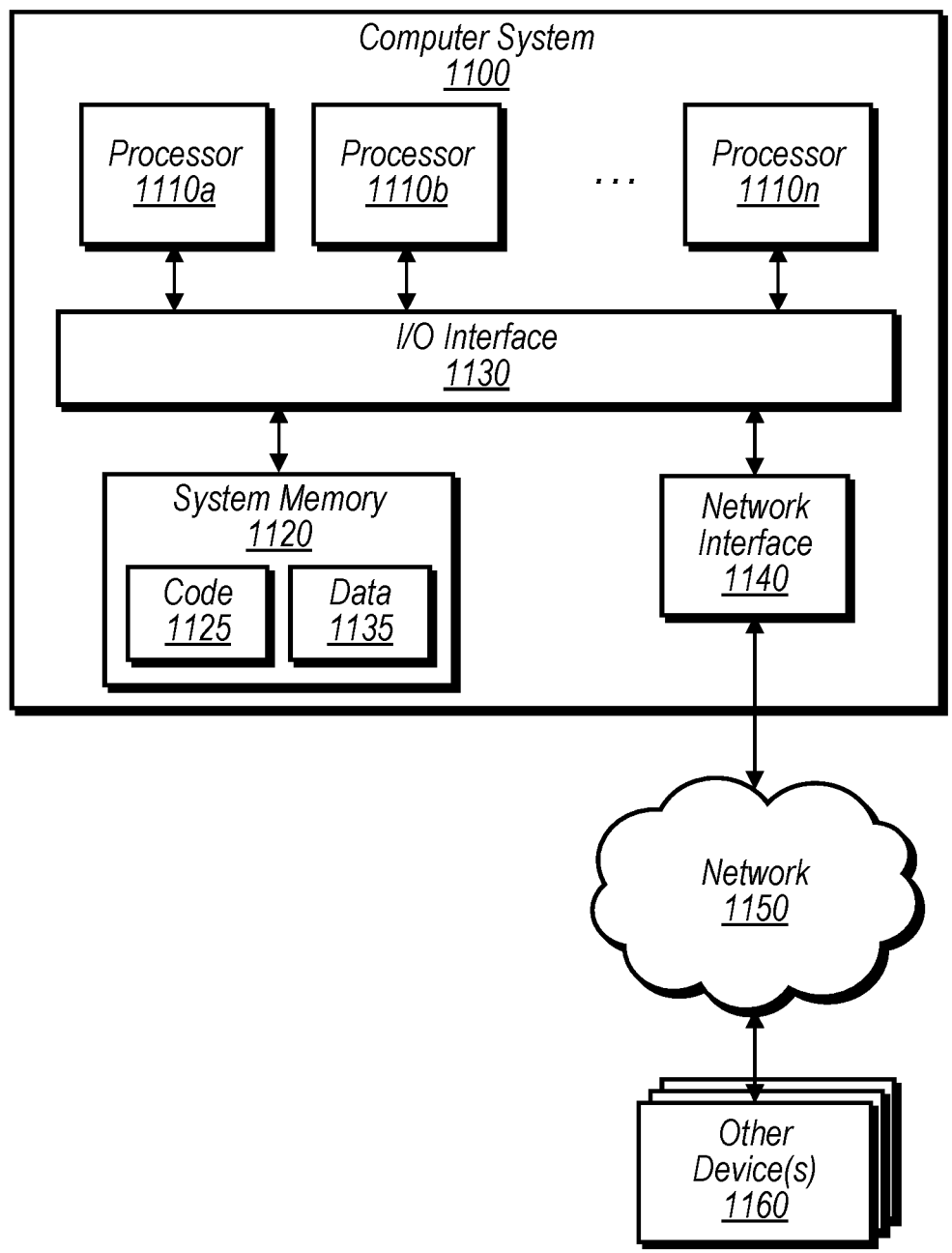
FIG. 11 is a block diagram illustrating an example computer system that implements some or all of the techniques described herein, according to some embodiments.

Any of various computer systems may be configured to implement processes associated with a vehicle information service, a vehicle information service client application, a provider network that implement a vehicle information service, an operating system in a vehicle or device, or any other component of the above figures. For example, FIG. 11 is a block diagram illustrating an example computer system that implements some or all of the techniques described herein, according to some embodiments. In various embodiments, the vehicle information service, the vehicle information service client application, the provider network that implements the vehicle information service, the operating system in a vehicle or device, or any other component of the above figures FIGS. 1-10 may each include one or more computer systems 1100 such as that illustrated in FIG. 11.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computing device 1100 may be a uniprocessor system including one processor or a multiprocessor system including several processors 1110a-1110n (e.g., two, four, eight, or another suitable number). Processors 1110a-1110n may include any suitable processors capable of executing instructions. For example, in various embodiments, processors 1110a-1110n may be processors implementing any of a variety of instruction set architectures (ISAs), such as the x86, PowerPC, SPARC, or MIPS ISAs, or any other suitable ISA. In multiprocessor systems, each of processors 1110a-1110n may commonly, but not necessarily, implement the same ISA.

System memory 1120 may be configured to store program instructions and data accessible by processor(s) 1110a-1110n. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1120 as code (i.e., program instructions) 1125 and data 1135.

In one embodiment, I/O interface 1130 may be configured to coordinate I/O traffic between processors 1110a-1110n, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processors 1110a-1110n.

Network interface 1140 may be configured to allow data to be exchanged between computing device 1100 and other devices 1160 attached to a network or networks 1150. In various embodiments, network interface 1140 may support communication via any suitable wired or wireless general data networks, such as types of Ethernet networks or cellular networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-readable (i.e., computer-accessible) medium configured to store program instructions and data as described above for implementing embodiments of the corresponding methods, systems, and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 1100 via I/O interface 1130. One or more non-transitory computer-readable storage media may also include any volatile or non-volatile media such as RAM (e.g. SDRAM, DDR SDRAM, RDRAM, SRAM, etc.), ROM, etc., that may be included in some embodiments of computing device 1100 as system memory 1120 or another type of memory. Further, a computer-readable medium may include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system for implementing a vehicle information service, the system comprising:
a service provider network comprising:
one or more networking devices configured to establish connections between the service provider network and a plurality of vehicles; and
one or more computers configured to:
implement a first application programmatic interface (API) configured to:
receive, from a client of the vehicle information service, a set of one or more inclusion parameters for vehicles to be included in a vehicle fleet from which data is to be collected; and
receive, from the client, a minimum sample size for the vehicle fleet, wherein the minimum sample size defines a minimum number of vehicles to collect data from that satisfy the one or more inclusion parameters; and
implement a second API configured to:
send a notification to the client in response to data being collected from the minimum number of vehicles of the vehicle fleet; and
provide, to the client, access to a data set comprising data collected from the minimum number of vehicles of the vehicle fleet,
wherein to collect the data from the minimum number of vehicles of the vehicle fleet, the one or more computers are configured to:
cause the one or more networking devices to establish respective connections between the provider network and respective ones of a set of the plurality of vehicles;
collect vehicle characteristic information from the set of vehicles via the established respective connections;
determine, based on the collected vehicle characteristic information and the one or more inclusion parameters, whether the respective ones of the set of vehicles have characteristics that satisfy the one or more inclusion parameters;
for vehicles of the set that satisfy the one or more inclusion parameters, establish respective secure connections between the one or more computers and a controller area network (CAN) bus or an on-board diagnostic (OBD) interface of the respective ones of the vehicles that satisfy the one or more inclusion parameters; and
collect data from the respective ones of the set of vehicles that satisfy the one or more inclusion parameters via the secure connection.

2. The system of claim 1, wherein the one or more computers are configured to:
cause the one or more networking devices to establish additional connections between the provider network and respective ones of another set of the plurality of vehicles;
determine whether the respective ones of the other set of vehicles have characteristics that satisfy the one or more inclusion parameters;
for vehicles of the other set that satisfy the one or more inclusion parameters, establish respective secure connections between the one or more computers and a controller area network (CAN) bus or an on-board diagnostic (OBD) interface of the respective ones of the vehicles of the other set;
collect data from the respective ones of the vehicles of the other set that satisfy the one or more inclusion parameters via the secure connections; and
store the collected data from the respective ones of the vehicles of the other set that satisfy the one or more inclusion parameters,
wherein the one or more computers are configured to establish secure connections with one or more additional sets of vehicles and repeat said determine, said establish secure connections, said collect, and said store the collected data, such that data is collected from at least the minimum number of vehicles defined by the minimum sample size.

3. The system of claim 1, wherein the first API is further configured to:
receive, from the client, one or more restrictions regarding one or more time windows when the plurality of vehicles are to be contacted, or one or more restrictions regarding a limit on a number of times in a given time period the plurality of vehicles are to be contacted,
wherein the one or more computers are configured to enforce the one or more restrictions regarding the one or more time windows or the one or more restrictions regarding the limit on the number of times the plurality of vehicles are to be contacted in the given time period.

4. The system of claim 1, wherein the plurality of vehicles each comprise a computing device storing program instructions, that when executed, implement a vehicle information service client application,
wherein to establish the respective secure connections between the one or more computers of the provider network and the CAN bus or the OBD interface of the respective ones of the vehicles, the one or more computers of the provider network are configured to establish the secure connections via the vehicle information service client applications implemented on the computing devices of the vehicles.

5. The system of claim 4, wherein the one or more computers are further configured to:
encrypt communications via the respective secure connections,
wherein the vehicle information service client applications function as interfaces between the CAN bus or the OBD interface of the respective vehicles for the encrypted communications, and
wherein the respective secure connections are encrypted according a first communication protocol, and wherein communications from the respective vehicle information service client applications to the CAN bus or the OBD interface of the respective vehicles are formatted according to a different communication protocol.

6. A method, comprising:
receiving, from a client of a vehicle information service, a set of one or more inclusion parameters for vehicles to be included in a vehicle fleet from which data is to be collected;
receiving, from the client, a minimum sample size that defines a minimum number of vehicles to collect data from that satisfy the one or more inclusion parameters, wherein the one or more inclusion parameters and the minimum sample size are received from the client via a first application programmatic interface (API) implemented on one or more computers of a provider network that implements the vehicle information service;
establishing respective connections between networking devices of the provider network and respective ones of a set of vehicles;

collecting vehicle characteristic information from the set of vehicles via the established respective connections;

determining, based on the collected vehicle characteristic information and the one or more inclusion parameters, whether the respective ones of the set of vehicles have characteristics that satisfy the one or more inclusion parameters;

establishing, for vehicles of the set that satisfy the one or more inclusion parameters, respective secure connections between the one or more computers of the provider network and respective vehicle data communication buses of the respective ones of the vehicles that satisfy the one or more inclusion parameters;

collecting data from the respective ones of the set of vehicles that satisfy the one or more inclusion parameters via the respective secure connections; and notifying the client, via a second API implemented on the one or more computers of the provider network, that data has been collected from the minimum sample size of vehicles of the vehicle fleet.

7. The method of claim 6, further comprising:
providing access to the client, via the second API, to a data set comprising the data collected from the minimum number of vehicles of the vehicle fleet that satisfy the one or more inclusion parameters.

8. The method of claim 7, wherein said providing access to the data set comprises:
implementing a graphical user interface depicting a replica vehicle; and assigning information related to component parts of the vehicles of the vehicle fleet that satisfy the one or more inclusion parameters to corresponding component parts of the replica vehicle depicted via the graphical user interface.

9. The method of claim 8, comprising:
generating statistical information based on data collected in relation to a plurality of matching component parts in the vehicles of the vehicle fleet, wherein the information assigned to the corresponding component parts of the replica vehicle depicted via the graphical user interface comprises the statistical information for the respective corresponding component parts.

10. The method of claim 6, wherein the one or more inclusion parameters comprise one or more of:
a vehicle make;
a vehicle model;
a vehicle year of manufacture;
vehicles that includes component parts of a particular component part manufacturer;
vehicles that includes component parts of a particular type; or
vehicles that includes component parts of a particular year of manufacture.

11. The method of claim 6, wherein the vehicles of the fleet each comprise a computing device storing program instructions, that when executed, implement a vehicle information service client application,
wherein said establishing the respective secure connections between the one or more computers of the provider network and the respective vehicle communications busses of the respective ones of the vehicles, comprises establishing the secure connections via the vehicle information service client applications implemented on the computing devices of the vehicles.

12. The method of claim 11, wherein the vehicle information service client applications are configured to receive read-only communications from the respective vehicle communications busses of the respective ones of the vehicles and are not configured to issue write requests to components parts of the respective vehicles connected to the respective vehicle communications busses.

13. The method of claim 6, wherein the data collected from the respective ones of the set of vehicles that satisfy the one or more inclusion parameters comprises one or more of:
component part performance data;
vehicle probe data; or
vehicle operational data.

14. The method of claim 6, further comprising:
implementing a vehicle owner notification API on the one or more computers;
determining, based on the collected data, that one or more maintenance tasks are to be performed for a particular vehicle with a particular owner; and
issuing a notification to the particular owner, via the vehicle notification API, indicating that the one or more maintenance tasks are due to be performed for the particular vehicle.

15. The method of claim 6, further comprising:
collecting data from other sets of vehicles for other clients of the vehicle information service;
storing the data collected from the respective ones of the set of vehicles for the client and the data collected from the other sets of vehicles for the other clients;
identifying common components in the respective ones of the vehicles and the other sets of vehicles; and
providing statistical information to the client or the other clients for the common components.

16. The method of claim 15, further comprising:
anonymizing the data collected from the set of vehicles and the data collected from the other sets of vehicles such that personally identifying information or information identifying a unique vehicle is not included in the stored data.

17. The method of claim 15, wherein providing the statistical information comprises:
implementing a graphical user interface depicting a generic replica vehicle; and
assigning the statistical information related to the common component parts to corresponding component parts of the generic replica vehicle depicted via the graphical user interface.

18. The method of claim 6, further comprising:
determining, based on the collected data, one or more software updates for vehicle software of the vehicles of the set vehicles; and
issuing to the vehicles of the set of vehicles, via a software update service, the one or more determined software updates.

19. One or more non-transitory, computer-readable storage media storing instructions that, when executed on or across one or more processors, cause the one or more processors to:
implement a first application programmatic interface (API) configured to:
receive, from a client of a vehicle information service, a set of one or more inclusion parameters for vehicles to be included in a vehicle fleet from which data is to be collected; and
receive, from the client, a minimum sample size for the vehicle fleet, wherein the minimum sample size defines a minimum number of vehicles to collect data from that satisfy the one or more inclusion parameters;
cause one or more networking devices of a service provider network to establish respective connections between the service provider network and respective ones of a set of vehicles;

collect vehicle characteristic information from the set of vehicles via the established respective connections;

determine, based on the collected vehicle characteristic information and the one or more inclusion parameters, whether the respective ones of the set of vehicles have characteristics that satisfy the one or more inclusion parameters;

for vehicles of the set that satisfy the one or more inclusion parameters, cause respective secure connections to be established between the provider network and the respective ones of the vehicles that satisfy the one or more inclusion parameters, collect data from the respective ones of the set of vehicles that satisfy the one or more inclusion parameters via the respective secure connections; and implement a second API configured to:

send a notification to the client in response to data being collected from the minimum number of vehicles of the vehicle fleet; and provide, to the client, access to a data set comprising data collected from the minimum number of vehicles of the vehicle fleet.

20. The one or more non-transitory, computer-readable storage media of claim 19, wherein the respective secure connections are established between the provider network and a vehicle data service client in communication with a controller area network (CAN) bus or an on-board diagnostic (OBD) interface of the respective ones of the vehicles that satisfy the one or more inclusion parameters.

* * * * *